March 9, 1948.
C. G. VOKES
2,437,489
AIR FILTER WITH HEAT EXCHANGE ARRANGEMENTS
Filed March 15, 1944
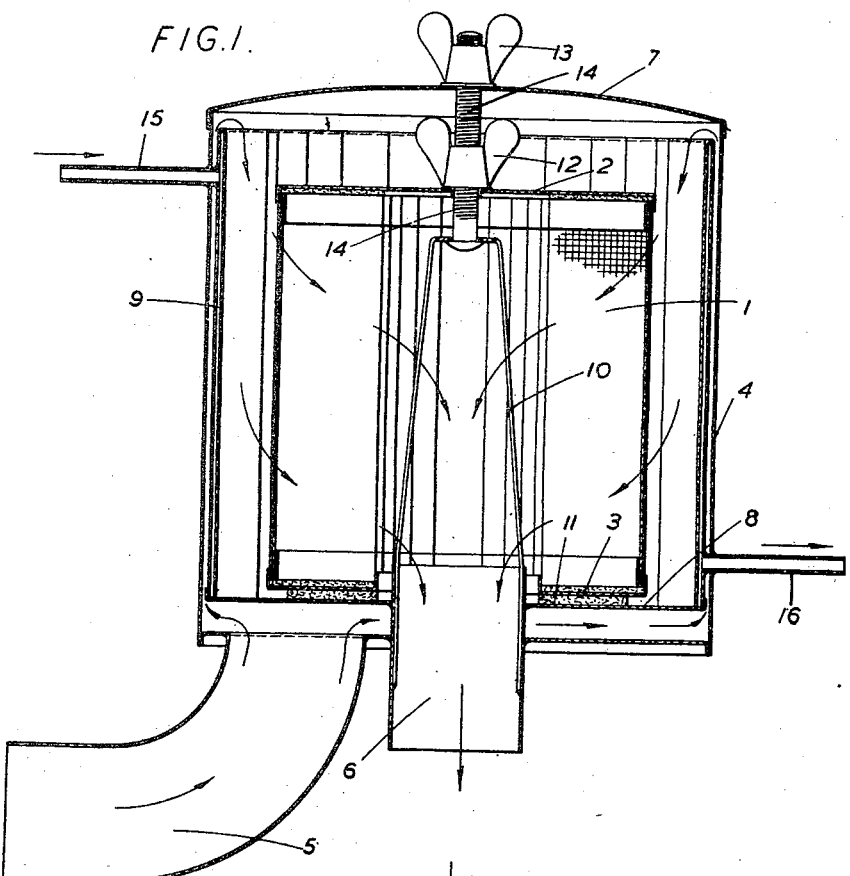
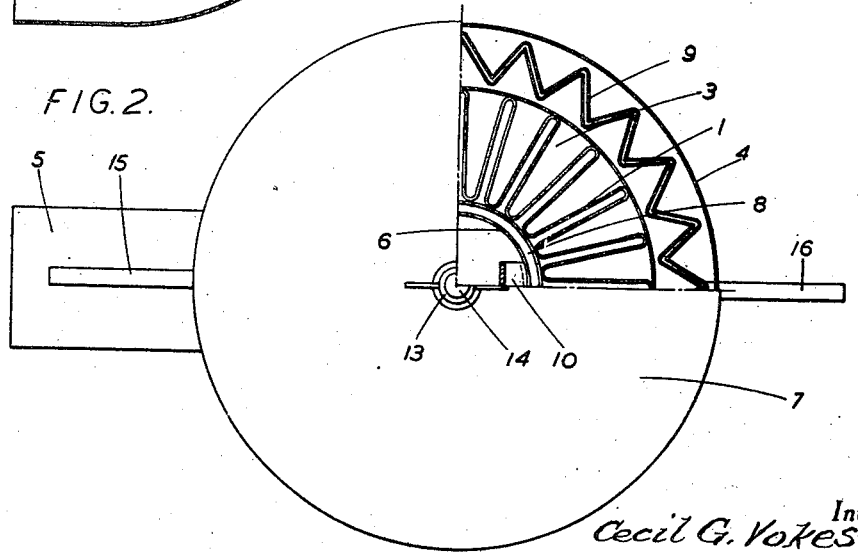
Inventor
Cecil G. Vokes
By
Attorney Patented Mar. 9, 1948

2,437,489

UNITED STATES PATENT OFFICE 2,437,489

AIR FILTER WITH HEAT EXCHANGE ARRANGEMENTS

Cecil Gordon Vokes, London, England, assignor to Vokes Limited, Guilford, Surrey, England Application March 15, 1944, Serial No. 526,572
In Great Britain January 21, 1943

2 Claims. (Cl. 183—32)

Overheating of lubricating oil is possibly more frequent than is generally realized by users of internal combustion engines. From one point of view the present invention provides a convenient arrangement in which the lubricating oil is cooled by the air passing to the engine intake, the intake air being simultaneously warmed to save fuel and help carburation. From another point of view, an oil cooler or air warmer is incorporated in an air intake filter and a new or improved combination of filter and heat exchanger is provided.

Other parts of the invention are embodied in a typical form shown by the accompanying drawings, the parts of the invention for which a monopoly is desired being those delimited by the claims.

In the drawings:

Fig. 1 is a central vertical section, and
Fig. 2 is a partially sectioned plan.

For convenience it is assumed that the space within a star-shaped fabric and wire gauze filter unit is connected, in a manner now familiar, to the air intake of a down-draught carburettor. The unit includes a star-shaped filtering screen 1 of fabric and wire gauze enclosed between end caps 2, 3. An outer casing 4 has an air inlet 5 and an air outlet 6 and is provided with a cover 7. The tube forming the air outlet extends into the outer casing and has welded to it a closure plate 8 at the bottom of the oil cooler element 9 as well as the spider or bridge piece 10 by which the filter unit is held against a packing ring 11 on the closure plate 8 and the covers 2 and 7 held in position by wing nuts 12, 13 on the bolt 14.

The oil cooler element 9 takes the form of a fluted or star-shaped annular chamber with its walls close together to give a considerable surface and a sufficient cross-sectional area for the oil flow in the form of a rather thin film. The hot oil from the engine enters by a pipe 15 and is withdrawn by a similar outlet pipe 16. It will be observed that the cylindrical casing 4 encloses the whole and, since the air space between the filter and cooler is closed at the lower end by the plate 8, the air rises outside the cooler, preferably somewhat above the filter level, and returns to be drawn into the filter from the space between the filter and cooler. When fitted to a vehicle, an air intake pipe may be carried forward to be fed from a forwardly facing entrance or scoop exposed to the outside air, so as to use the velocity of the vehicle to help the air admission. It will be noted that the flow of cooling air increases with the demand of the engine, but in some cases it may be desirable to have a change-over valve or flap (automatic or controllable) to draw air from under the bonnet or from outside or a variable proportion of each.

Obviously the invention can take many other forms, for example a flat rectangular casing with a pleated panel type of air filter and corresponding oil cooler, but the above should suffice to make its nature clear.

I claim:

1. In combination, a casing, an air exhaust through the bottom of said casing for carburetor intake, an air filter in said casing and closing said exhaust, a thin sleeve-like container concentric with said casing and surrounding said air filter, the outer wall of said container being spaced slightly from the casing wall to form a narrow air passageway therebetween, an oil inlet pipe extending through said casing and having communication with the top of said container at one side thereof and for supplying heated oil to said container from an engine, an oil outlet pipe extending through said casing and having communication with the bottom of said container at the opposite side thereof from said inlet pipe, and an air inlet opening in the bottom part of said casing to said air passageway between said casing and said container, whereby the air must pass up and over the full height and down at least part of the height of said container and thereby cool the oil therein and preheat the air before it is exhausted to a carburetor intake.

2. In combination, a casing, an air exhaust pipe extending centrally through the bottom of said casing for carburetor intake, a plate supported by said exhaust pipe within and spaced from the bottom of said casing, a cylindrical air filter in said casing concentrically surrounding said exhaust and supported by said plate, a thin sleeve-like container supported by said plate, within said casing and concentrically surrounding said air filter, the outer wall of said container being spaced slightly from the casing wall to form a narrow air passageway therebetween, an oil inlet pipe extending through said casing and having communication with the top of said container at one side thereof and for supplying heated oil to said container from an engine, an oil outlet pipe extending through said casing and having communication with the bottom of said container at the opposite side thereof from said inlet pipe, and an air inlet opening in the bottom wall of said casing for communication with the bottom of said casing below said plate and said air passageway between said casing and said container, whereby the air must pass up and over the full height of said container and thereby cool the oil therein and preheat the air before it is exhausted to a carburetor intake.

CECIL GORDON VOKES.

REFERENCES CITED

The following references are of record in the file of this patent:

UNITED STATES PATENTS

| Number | Name | Date |
| --- | --- | --- |
| 1,452,699 | O'Neill | Apr. 24, 1923 |
| 1,580,291 | Dollinger | Apr. 13, 1926 |
| 1,855,308 | Niven | Apr. 26, 1932 |
| 1,881,770 | Lyman | Oct. 11, 1932 |
| 1,906,984 | Lyman | May 2, 1933 |
| 1,914,063 | Barbarou | June 13, 1933 |
| 2,022,463 | Erschen et al. | Nov. 26, 1935 |
| 2,105,433 | Noble | Jan. 11, 1938 |
| 2,353,337 | Henkelman | July 11, 1944 |